(12) United States Patent
Kumar et al.

(10) Patent No.: US 6,230,162 B1
(45) Date of Patent: May 8, 2001

(54) PROGRESSIVE INTERLEAVED DELIVERY OF INTERACTIVE DESCRIPTIONS AND RENDERERS FOR ELECTRONIC PUBLISHING OF MERCHANDISE

(75) Inventors: Keeranoor Kumar, Peekskill; James Lipscomb, Yorktown Heights; Jai Menon, Croton-on-Hudson, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/100,418

(22) Filed: Jun. 20, 1998

(51) Int. Cl.⁷ ........................................ G06F 17/30
(52) U.S. Cl. ........................................... 707/104
(58) Field of Search .................. 707/104, 103, 707/102, 101, 100, 10, 512; 379/88.13; 348/7; 709/217, 219, 234, 226; 345/435, 428; 382/240; 375/265

(56) References Cited

U.S. PATENT DOCUMENTS

| 5,428,731 | 6/1995 | Powers, III | 707/501 |
|---|---|---|---|
| 5,469,206 | 11/1995 | Strubbe et al. | 348/7 |
| 5,485,280 | 1/1996 | Fujenami et al. | 386/123 |
| 5,528,490 | 6/1996 | Hill | 717/11 |
| 5,551,021 | 8/1996 | Haroda et al. | 707/104 |
| 5,586,264 * | 12/1996 | Belknap et al. | 709/219 |
| 5,621,660 | 4/1997 | Chaddha et al. | 709/247 |
| 5,634,040 * | 5/1997 | Her et al. | 345/435 |
| 5,644,324 | 7/1997 | Maguire, Jr. | 345/9 |
| 5,696,869 | 12/1997 | Abecassis | 386/52 |
| 5,706,290 | 1/1998 | Shaw et al. | 370/465 |
| 5,706,486 | 1/1998 | Cruz et al. | 713/501 |
| 5,710,887 | 1/1998 | Chelliah et al. | 705/26 |
| 5,719,786 | 2/1998 | Nelson et al. | 709/219 |
| 5,721,832 | 2/1998 | Westrope et al. | 705/27 |
| 5,721,878 * | 2/1998 | Ottesen et al. | 348/7 |
| 5,727,048 | 3/1998 | Hiroshima et al. | 379/93.12 |
| 5,732,239 | 3/1998 | Tobagi et al. | 711/114 |
| 5,764,235 * | 6/1998 | Hunt et al. | 345/428 |
| 5,898,833 * | 4/1999 | Kidder | 709/234 |
| 5,960,432 * | 9/1999 | Werner | 707/10 |
| 5,991,816 * | 11/1999 | Percival et al. | 709/247 |
| 5,996,015 * | 11/1999 | Day et al. | 709/226 |
| 5,999,569 * | 12/1999 | Oshima | 375/265 |
| 6,031,940 * | 2/2000 | Chui et al. | 382/240 |
| 6,041,335 * | 3/2000 | Merritt et al. | 707/512 |

* cited by examiner

*Primary Examiner*—Hosain T. Alam
*Assistant Examiner*—Sanjiv Shah
(74) *Attorney, Agent, or Firm*—Steven J. Meyers

(57) ABSTRACT

Network presentations to be displayed on the users screen are divided into increasing more detailed phases. In each phase, the code controlling the phase and the data displayed in the phase are segmented. In transmission over the network, the transmission of the code segment of each phase precedes the transmission of the data segment for that phase. Code transferred to the user's terminal monitors the progress of the display of the current phase on the users screen. When sufficient data for the new phase showing then displayed scene enters the users storage, the code for the incoming phase takes over the presentation on the screen substituting data from the incoming phase for the proceeding phase. In this way, transitions are orderly and seamless.

27 Claims, 14 Drawing Sheets

FIG. 13A
State 1: Level 1 Media being Rendered and Level 1 Data Being Loaded

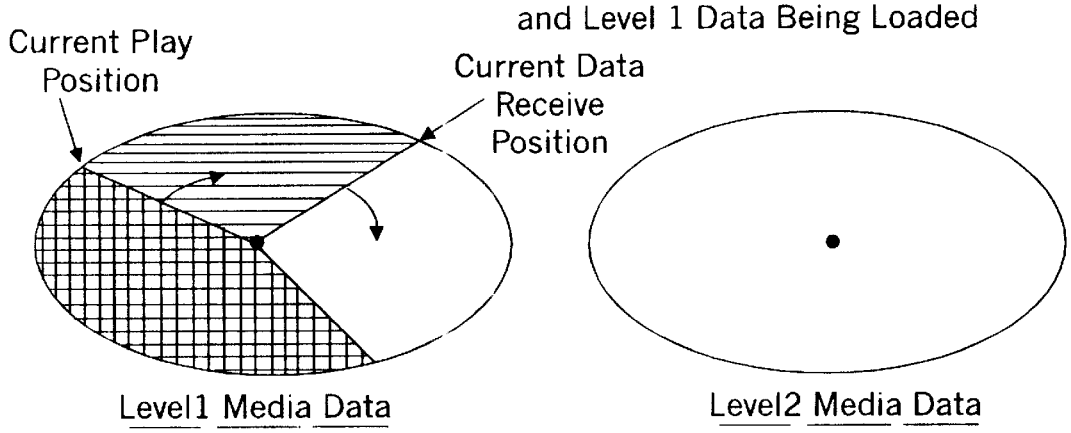

Level1 Media Data

Level2 Media Data

FIG. 13B
State 2: Level 1 Media being Rendered and Level 2 Data Being Loaded Position determined by estimating the amount of data to be buffered to have jitter-free rendering at current data receive rate

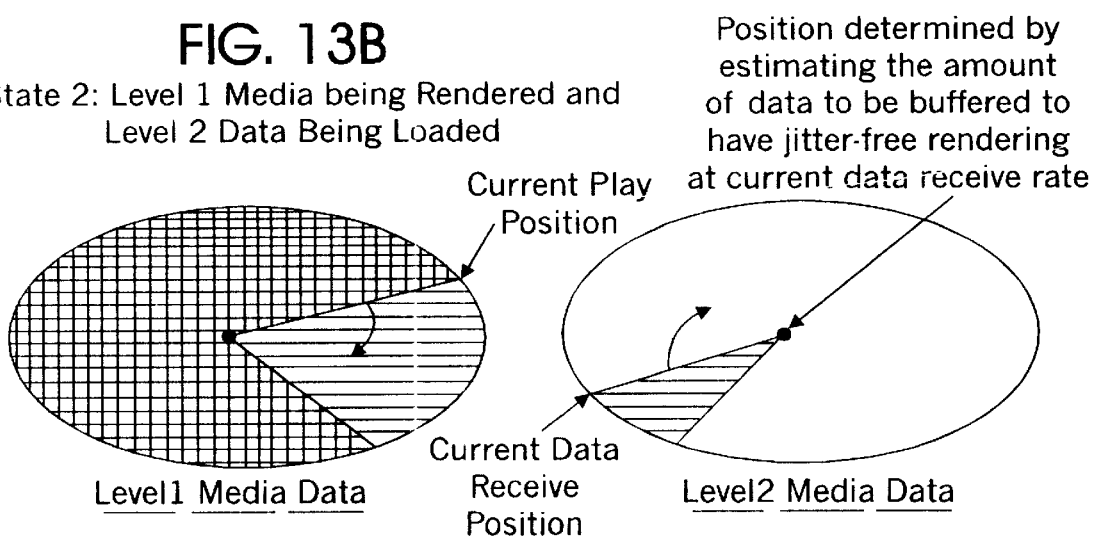

Level1 Media Data

Level2 Media Data

FIG. 13C
State 3: Level 2 Media Rendering Starts, Level 1 Stops, Level 2 Data Loading Continues

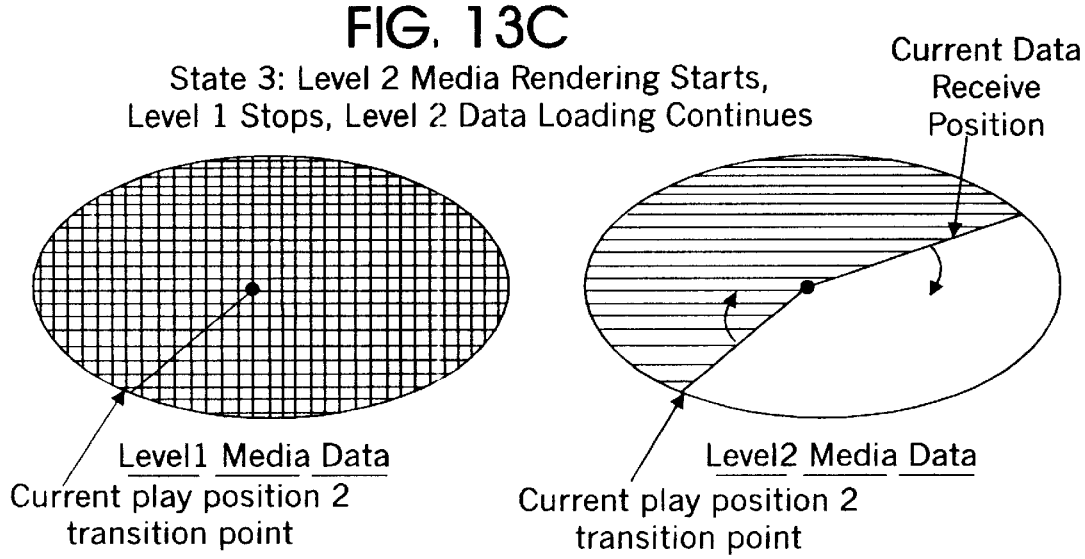

Level1 Media Data
Current play position 2 transition point

Level2 Media Data
Current play position 2 transition point

PROGRESSIVE INTERLEAVED DELIVERY OF INTERACTIVE DESCRIPTIONS AND RENDERERS FOR ELECTRONIC PUBLISHING OF MERCHANDISE

FIELD OF THE INVENTION

The present invention relates to providing images on the internet and more particularly, to the display of moving images on the internet.

BACKGROUND OF THE INVENTION

The providing on the internet of rich media presentations, containing still images, animated images, video images and audio, is handicapped by the need to transmit large blocks of code and data to the client. This is a serious impediment for presenting products to electronic commerce customers who are typically connected over low-bandwidth dial-up links. They cannot be expected to pre-load code and data or wait for very long before their shopping experiences commence. A second problem concerns providing the right amount of various rich media technologies to easily and effectively address the problem of just communicating sufficient information about the merchandise. Rich media technologies either convey too little or using complicated capture/authoring processes convey far too much. A final problem concerns providing the end-user sufficient control to examine the details of a product. Examples of desirable features would be to enable a user to zoom in to examine the texture of an object such as a handbag, or turning the handbag around to see all sides, or opening its zipper to examine the inside. This translates into a need to support seamless and efficient transitions within and across multiple media type representations of the merchandise.

Therefore it is an object of the present invention to provide an improved method and apparatus for providing data for rich media experiences.

It is another object of the invention to provide a new method to arrange and transmit data and code for presenting rich data experiences.

BRIEF DESCRIPTION OF THE INVENTION

In accordance with the present invention, network presentations to be rendered at the user's terminal are divided into phases for sequential transmission in the order of increasing detail of the phases. In each phase, the code controlling the phase and the data presented in the phase are segmented In transmission, the code segment for any phase precedes the data segment of that phase. At the user's terminal the transmitted code monitors the present performance of one phase and the receipt of data for the next more detailed phase. When sufficient incoming data has been received for uninterrupted performance of the more detailed phase, the data of the more detailed phase is used in the presentation. In this way, transitions between phases are made orderly and seamless.

The loading of code and data of the phases into the user's storage and its presentation on the user's terminal, can be varied from being fully automatic to being under the full control of the user. In a fully automatic mode of operation, loading code and data for one phase of the presentation follows immediately on the heels of that for the preceding phase. The presentation also changes from one phase to the more detailed phase without user intervention. As opposed to the fully automatic mode of operation, a mode of operation under the full control of the user is possible where fetching and presentation of each phase occurs only by user initiation. Intermediate modes of operation involve anticipatory fetching where a selection for presentation of one phase causes the system to anticipate progress to the next phase, loading the code and data for the next phase into the computer so that when the user does select the next phase, the performance of the later phase seems immediate.

Presentations are delivered over a network from a server with a rendering engine which dynamically composes a delivery file out of portions extracted from a previously prepared presentation file. The portions chosen by the rendering engine for the delivery file are based on inputs received from a client terminal. These portions are sequenced in the delivery file in the order in which the user requested them. It responds dynamically to those inputs to change the contents of the delivery file on the fly.

Presentation files contain visual elements such as still images and animation, video, 3D geometric sequences and also include audible elements in the form of speech and music. The various elements are created by a process of capture, editing and data compression. In editing, software is used to automatically recognize and eliminate redundant images in a sequence, and distinguish background from objects and eliminate the background. Compression and encoding modules are used to generate multiple qualities for the various phases of the presentation.

BRIEF DESCRIPTION OF THE DRAWINGS

A better understanding of the invention can be had by the following description of one embodiment thereof while referring to the accompanying figures of which:

FIGS. 11, 12 and 13 are a flow diagram of a block diagram and an illustration respectively of transition between phases of a presentation.

DETAILED DESCRIPTION OF AN EMBODIMENT OF THE INVENTION

Figure 1:
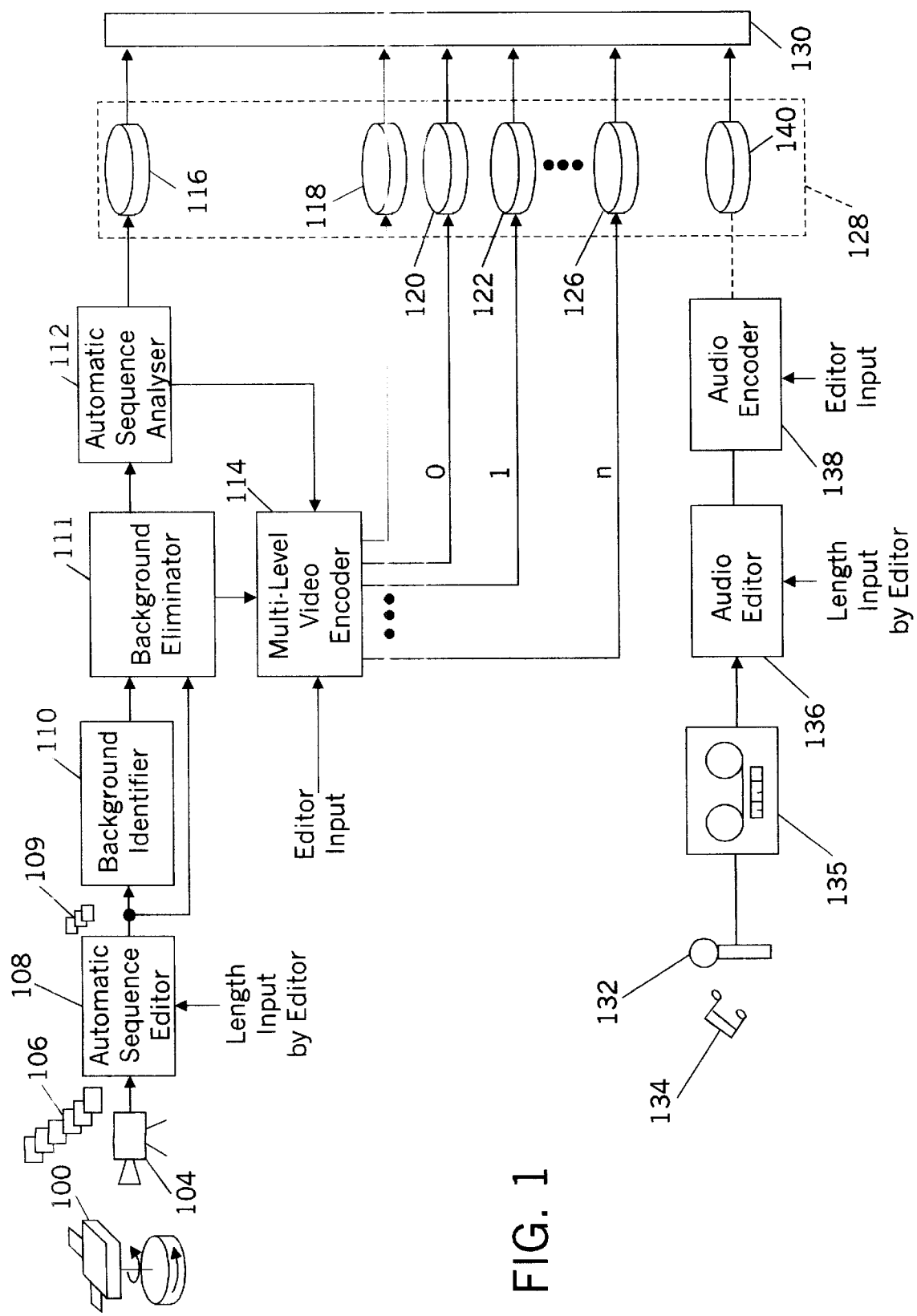
FIG. 1 illustrates the capturing of data for network presentations.

Referring now to FIG. 1. a three-dimensional object 100 mounted on a turntable 102 is spun before a camera 104 producing images 106. The images 106 are scanned by an automatic sequence editor 108 which receives input from an editor to eliminate duplicated images (for instance, elimination of any frame of the rotated object containing a view of the object which is more than is viewed in a 360° spin of the object). The objects 100 are generally photographed against a plain background however as a result of variations in lighting or other abnormalities in the picturing process, there may be variations in color and intensity of the background. Those can be eliminated by a background identifier 110 and eliminator 111. The background identifier 100 scans the image looking for variations in color and intensity to identify the background portion of the image. The background eliminator 112 eliminates the identified background if either variation in color or intensity exceeds a certain preset level.

Images from the background eliminator 111 are sent simultaneously to an automatic sequence analyzer 112 and an image and a multi-layer video encoding circuit 114. The automatic sequence analyzer 112 scans the object and generates frame hints to the image and multi-layer video encoding 114. Frame hints consist indicating which frames 109 contain changes in color and/or contour of the object 100. Frame hints are stored in separately accessible storage segment 116.

Key frame hints from the automatic sequence analyzer are also used by the image and multilayer video encoding circuitry 114 to take the frames 109 provided by the background eliminator 111 and produce a number of views of the object stored in a separately accessible segments of storage 118 to 126. One of the views is a still frame of the object 100 stored in segment 118. Another view is an animated representation of the object 100 as it rotates. This view is stored in separately accessible segment 120. The animated sequence shows a full rotation of the object 100. However, the definition of the object presented is such that it looks essentially like a flat cartoon character.

The animated sequence is followed by a series of video sequences where the video sequences, by virtue of being composed of more image frames, are more detailed than the animated sequence, and each video sequence level, 0 to n, is more detailed than the previous lower leveled sequence. Here levels 0, 1, and n are shown. Each stored in a separately accessible storage element 120, 122 and 124 respectively. It is understood by showing 0 to n levels that as many levels of video encoding as necessary can be provided. Similarly, though not illustrated differently, detailed levels of the still frame and the animated sequences can be provided.

Figure 2:
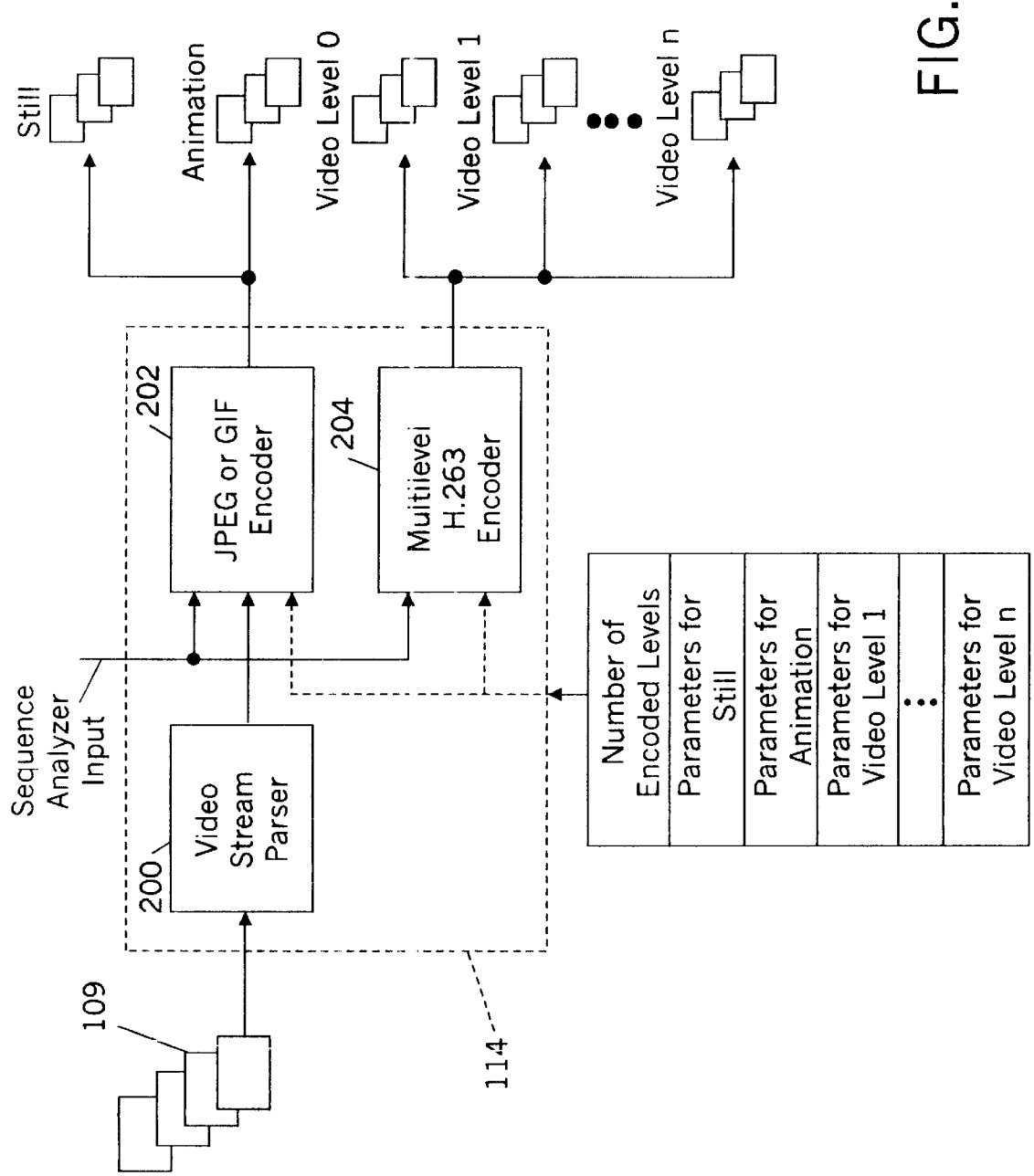
FIG. 2 is a more detailed view of the multilevel still image, animation and video encoder of FIG. 1.
Figure 3:
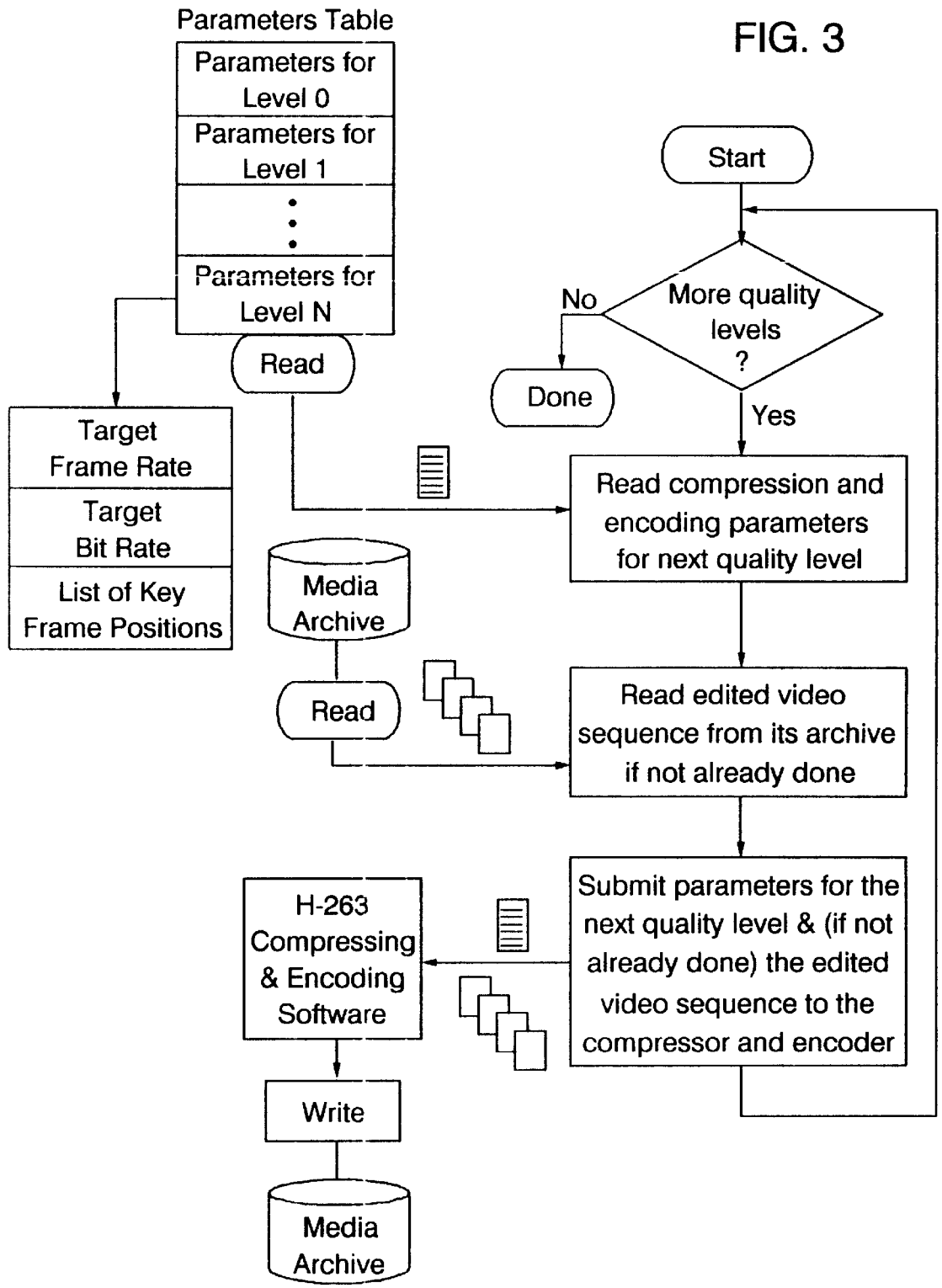
FIG. 3 shows the operation of the multilevel still image animation and video encoder of FIG. 2.

The data in the storage elements 116 to 126 has been compressed by the multilevel video encoder 114 using standard H.263 of the Telecommunication sector of the ITU. As shown in FIG. 2, the frames 109 from the background eliminator 111 are fed to a video stream parser 200 of the video encoder 114. The parser receives the frames and parses them based on frame selection input it receives through the automatic sequence analyzer. The parsed frames are then sent to a JPEP or GIF encoder 202 as well as to the H.263 encoder 204. The encoder receives parameter information from an author for the various levels This parameter information includes resolution of tile level, target frame and bit rates for the level and key frame positions. While, as pointed out above, only a single still frame and animation frame level is shown, it is understood that multiples of these can be provided. FIG. 3 shows the operation sequence of the video encoder of FIG. 2. Referring again to FIG. 1 the data makes up a data ensemble 128 of the single object 100. The data ensemble is for an author (either an individual or an automatic authoring device) to be used, alone or with other data ensembles, in preparing a video performance sequence from the data in the various segments of storage. The segments 115 to 126 are accessible through a gate circuitry 130 to be mixed or matched by the editor to provide a composite performance.

In addition to the video or image datas the ensemble 128 contains audio data To provide audio data microphone 132 captures sounds 134 provides them to a recording device 135. An editor, either an individual or an automatic editing device 136 edits the sound into a sequence associated with the video data sequence in the data ensemble. The audio data is then compressed in an audio encoder 138 using international compression standard G.723 of the Telecommunications sector of the ITU and stored in a separately accessible section 140 of memory so that all elements 118 to 125 and 140 can be accessed through access circuitry 130 by an editor to create a performance containing device 100 and associated sounds 134.

Figure 4:
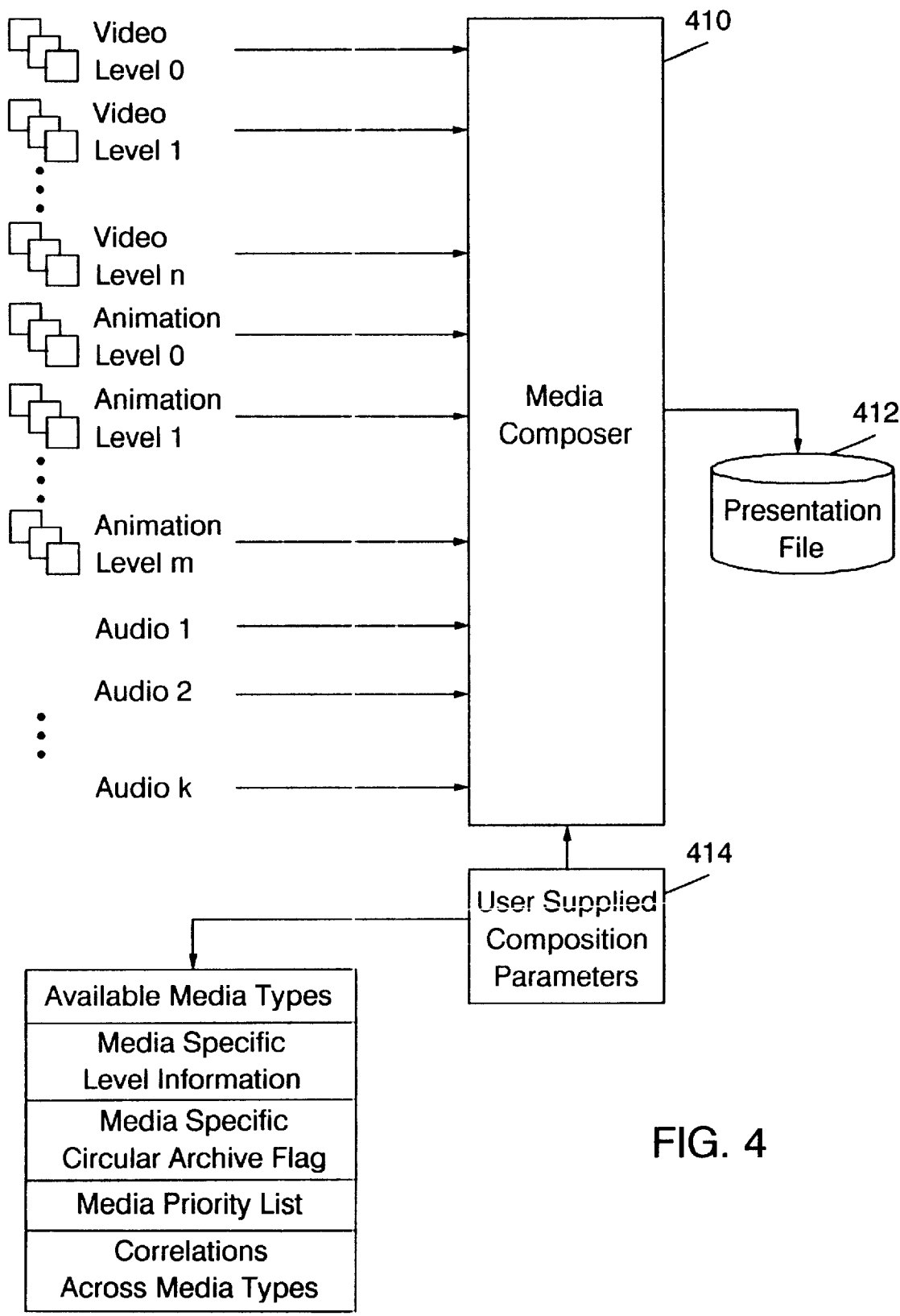
FIG. 4 illustrates the authoring of a presentation into data segments for the phases of the presentation.

The creation of a performance is accomplished as shown in FIG. 4. The media sequences captured in storage segments 116 through 126 and 410, form inputs to the media composer 410. In FIG. 4, multiple levels of animation, as well as multiple audio, sequences, are shown as being inputs to the media composer 410. Although not illustrated, the video and animation sequences can also be for a plurality of different objects such as object 100.

The media composer 414 is an individual that forms the presentation from the components 110 to 126 by inputting information 416 producing the presentation data file 412. A multiple format to interleave the data belonging to various segments is employed by the composer in producing this presentation data file. This format is described in FIG. 6.

Figure 5:
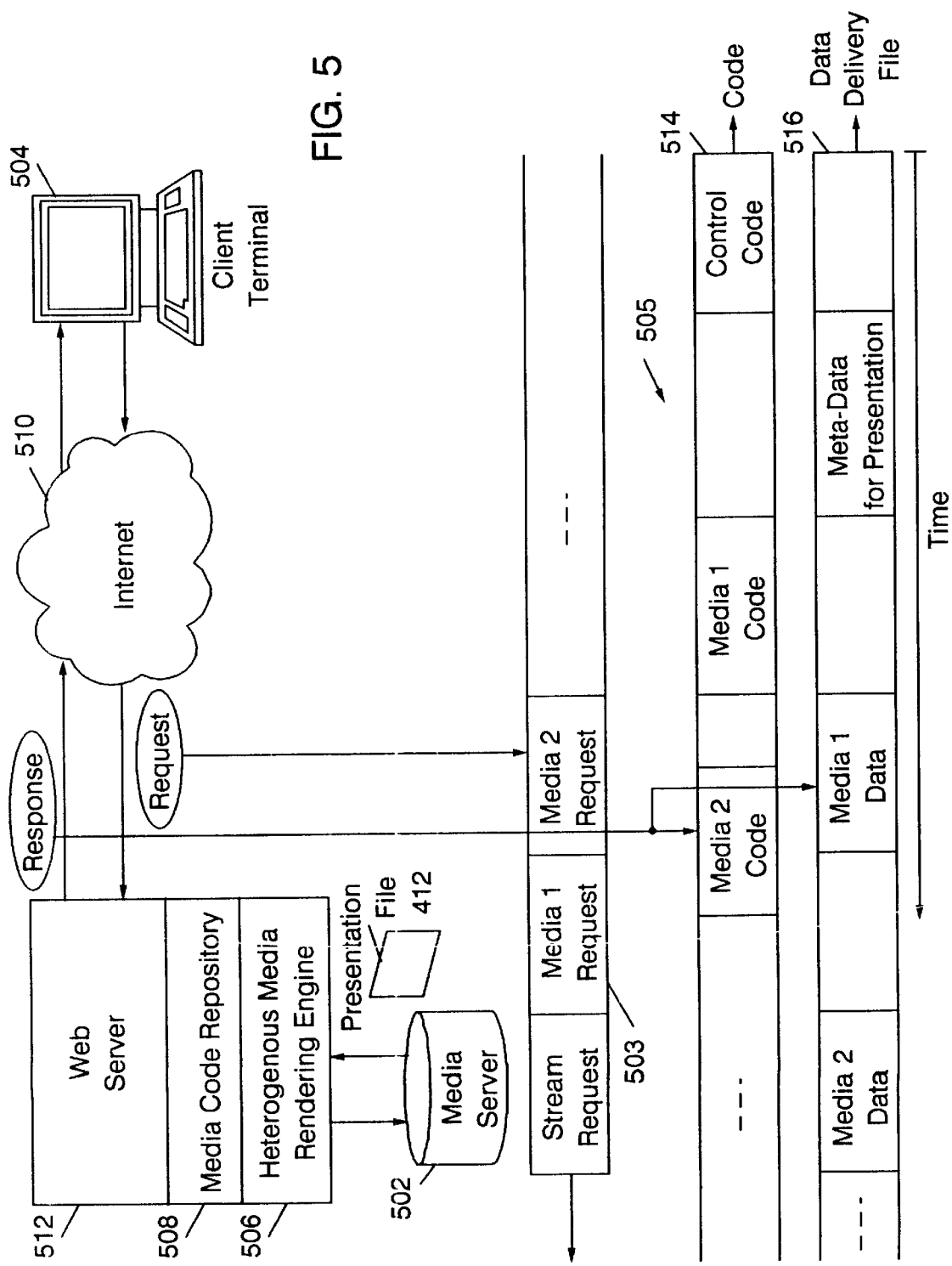
FIG. 5 illustrates providing of the code and data segments of the various phases of the presentation on the internet.

As shown in FIG. 5, the presentation file 412 is stored in the media server 502 for presentation over the internet. Upon requests 503 for information from the presentation file by a client from the client's terminal 504, a delivery file engine 506 obtains information from the media server 502 and generates a delivery file tailored to the requests of the user. The delivery file 505 may or may not contain all the data of the presentation file 502. For instance. the request may involve a still phase (media 1) and a level 1 video phase (media 2) bypassing the animation and level 0 video phases. Therefore, the delivery file would not contain the data and code for the animation and first level phases contained in the presentation file. The generated delivery file is stored in a repository 508 for delivery over the internet 510 by a web server 512.

The presence of various media data segments, as well as their order of presence in the delivery file, is dictated by a necessity and priority sequence determined for the client terminal's session. After the user has communicated to the server the media types, quality and order, a priority is assigned to the transmission of data as follows. Highest priority is assigned to the delivery or initialization code 514 and information (meta data) 516 required to enable the client terminal 504 to handle the data that follows. After delivery of the initialization file, essential highest priority is granted to the delivery of the code and data for media type and media quality the client intends to begin the presentation with. Once all user requested phases are delivered, third highest priority is granted to the delivery of media data spatially and temporally adjacent data already delivered by the delivery file. Fourth highest priority is assigned to the delivery of the media data of the next higher quality of level within the same media type already delivered in the delivery file. Fifth highest priority is assigned to the delivery of the next media type to an already requested type. Priority is assigned in the ascending sequence of image, animation, audio, video and 3D geometry. As mentioned previously, transmission of the control code of a phase is always transmitted first followed by the transmission of media data of that phase. Having determined the priority sequence, the data segments discussed in the above priority sequence are placed in the delivery file in the order of highest priority first. Actual delivery of each segment however, may take place only at the time of need as determined by the communication between server side engine 506 and client terminal 504, dynamically during the presentation. Media code segments are similarly delivered dynamically at the point of request from the media code repository 508 associated with the web server 512.

Figure 6:
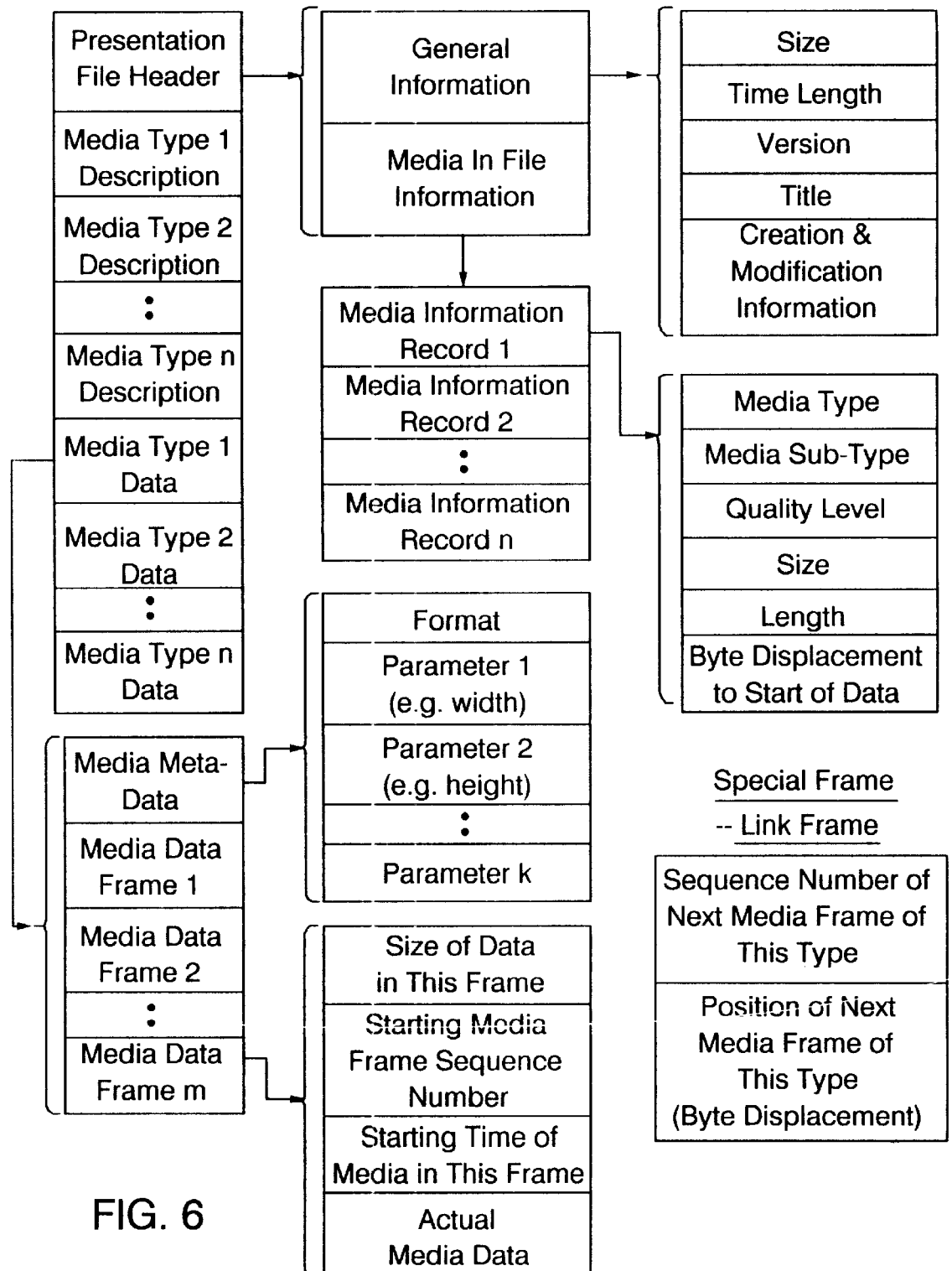
FIGS. 6 and 7 illustrate the formats for the presentation file and the delivery file respectively.
Figure 7:
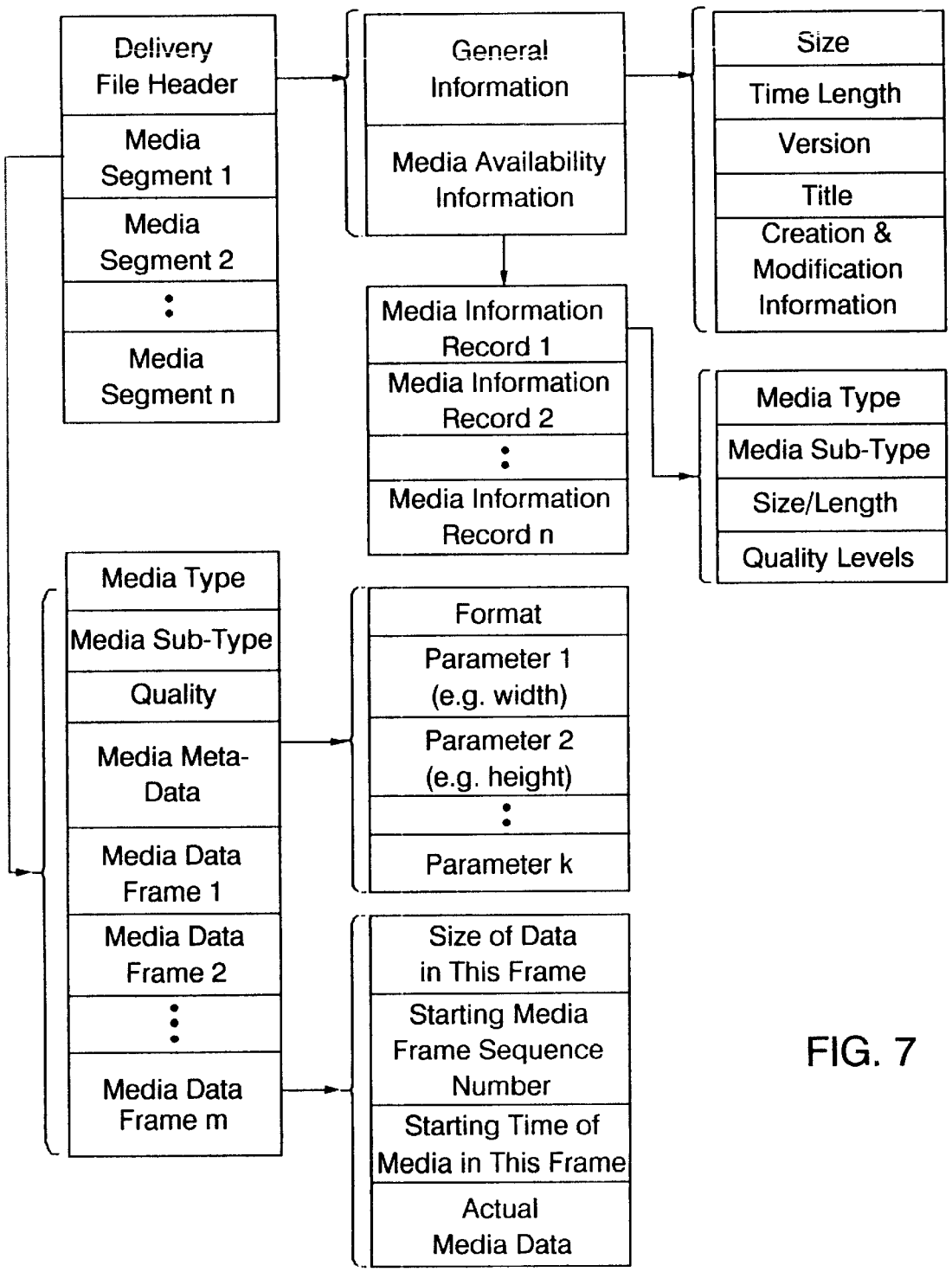

The formats for the presentation and delivery files are shown in FIGS. 6 and 7, respectively. Both formats require a file to begin with a general information segment followed by a media information segment. The general information segment describes the aspects like total size and time length. The media information describes all media types and instances that can be found in the files. The media data segments are the ones that carry actual media bit streams, and they are diffefently organized in the two formats. All media data pertaining to a media type and quality occur together in the presentation file, whereas this is not a necessity in the delivery file. This is because the delivery file is optimized to ensure that delivered data rates for each media type and quality can be sustained to the extent possible, whereas the presentation file is optimized for easy access.

Figure 8:
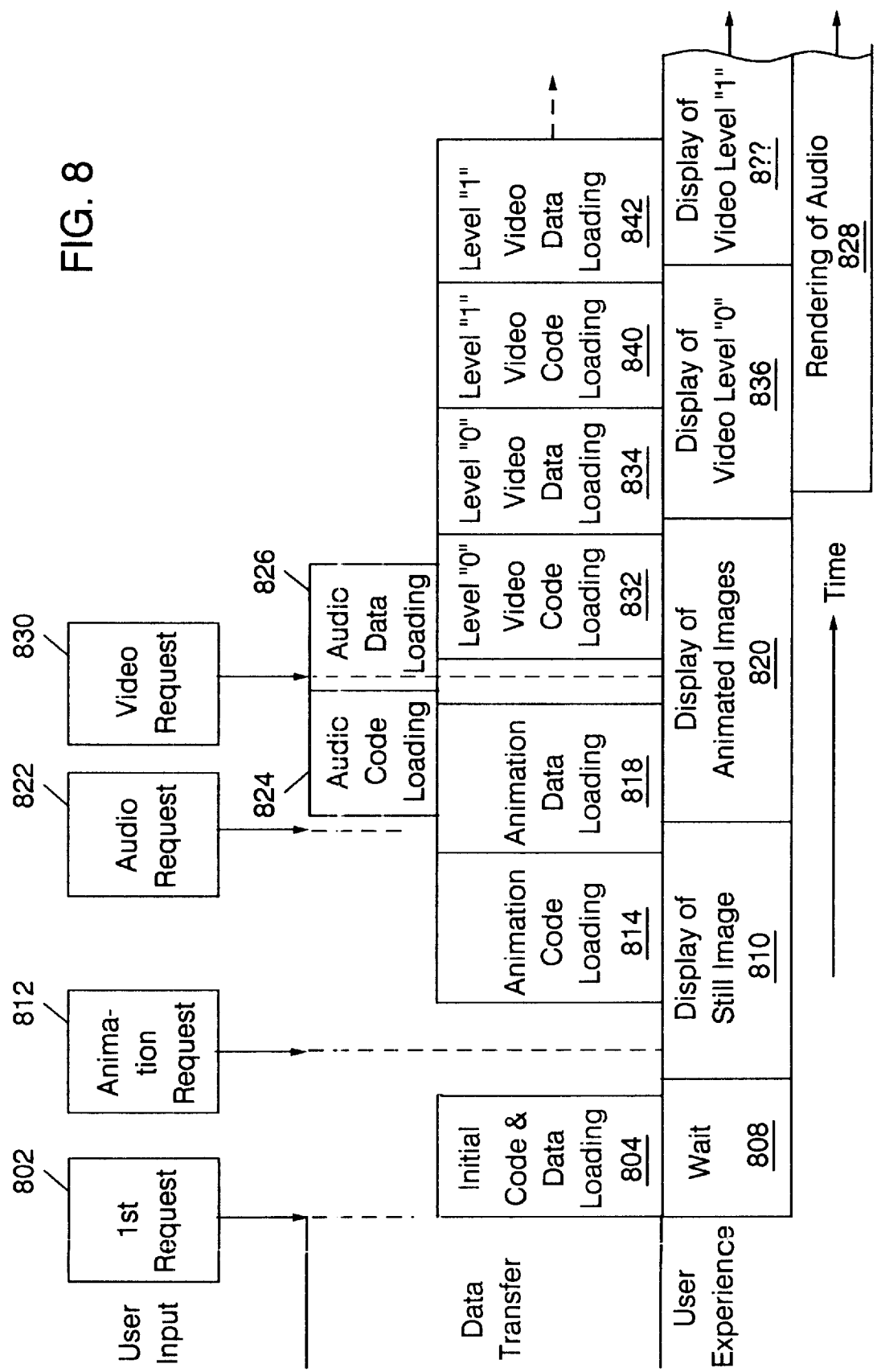
FIGS. 8 to 10 illustrate the timing of receipt and display of code and data of the presentation for various modes of operation.

FIG. 8 shows sequencing of transmission and performance that occurs where the user has initially selected only the still phase of the presentation. As shown after the initial selection 802, the initial still image and the still image code 804 are loaded into the user's machine. While the code for the still phase is loading, a wait 808 is experienced by the user. After the initial loading 804, a still image is displayed 810 and the user can request transition of the presentation to animation 812. This results in the animation code loading 814 followed by the animation data loading 818. At some point after the animation data starts loading into the user's machine (before all the data is loaded), the user experiences a transition from still to animation mode on display 800.

During animation data loading, the user may request audio messages 822. After a slight delay the audio code starts loading into the user's machine 824 followed by the audio data 826. Soon after the audio data starts loading, the user experiences sound 828 from the computers audio program. There is no wait until completion of the loading of audio data into the machine. As further audio data comes on board, the audio message continues.

After seeing the animation clip in whole or part, a user wishing to get a more detailed view of the object requests transition 830 to a video presentation. Video code for level 0 starts loading after a transmission delay. The loading of video data 834 for level 0 follows right on the heels of the video code for that level. The change of animation display to the video display does not wait for loading of the complete level 0 video data file or a complete rotation of the device 100. As soon as sufficient level 0 data to provide a continuous presentation of the device 100 then being displayed is loaded into the users machine, the display transitions to the more detailed presentation.

Once the loading of the level 0 data is complete, it is followed by loading of level 1 code 840 followed by level 1 video data 842. The transmission of the level 1 video code and data does not await the user's request for it. Neither does the display of level 1 video data. It can be seen once the request for transition from animation to video is made, the video data display of the object 100 begins and various video level code and data are loaded into the client's terminal. Loading of a level does not have to wait for a request for the level to occur. Furthermore, screen performance will progress from video level to video level with increasing detail without user intervention. Of courses the user can always stop the progression and end the session.

Figure 9:
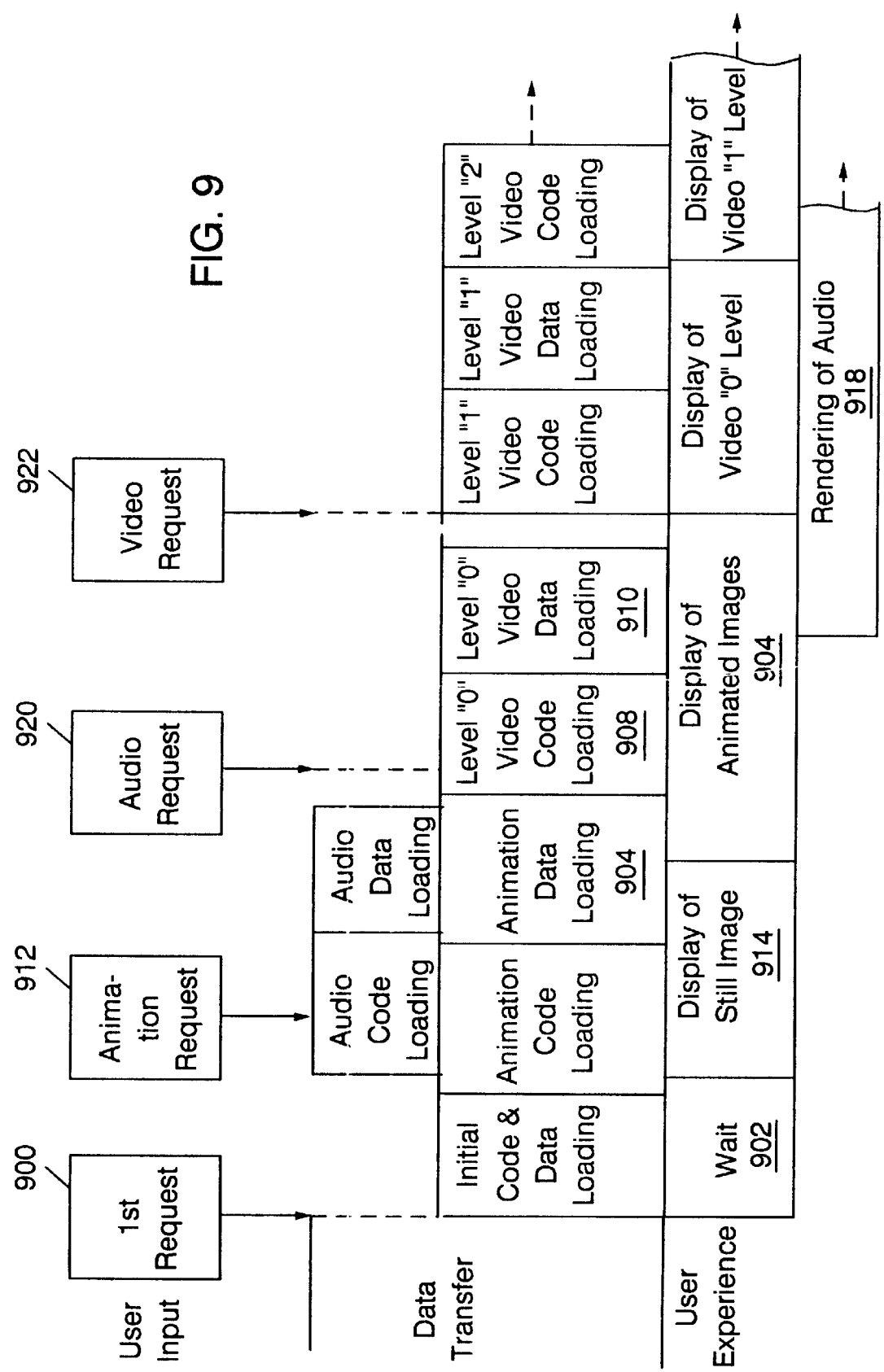

An alternative loading approach is shown in FIG. 9. There is a preemptive fetch of code and data. upon the initial request 900, the server starts loading code into the users machine. The loading is continuous, the animation code and data 902 and 904 immediately follow loading of the initialization code and data 906 and in turn are followed by the loading of the level 0 video code 908 and video data 910 in that order. Display transitions must await the decisions of the user. The user must request 912 the transition to animation to obtain a change from the still image to the animated display 916. Similarly, the onset of audio 920 must await the users request. Also, the transition from the animated display to video display must be requested. When a transition is requested, it is immediate since the level 0 video code and data are already loaded. The request also triggers the transmission and loading of all higher level versions of the video data and code. As a result, the transition of the display to the various levels of code are continuous and seamless.

Figure 10:
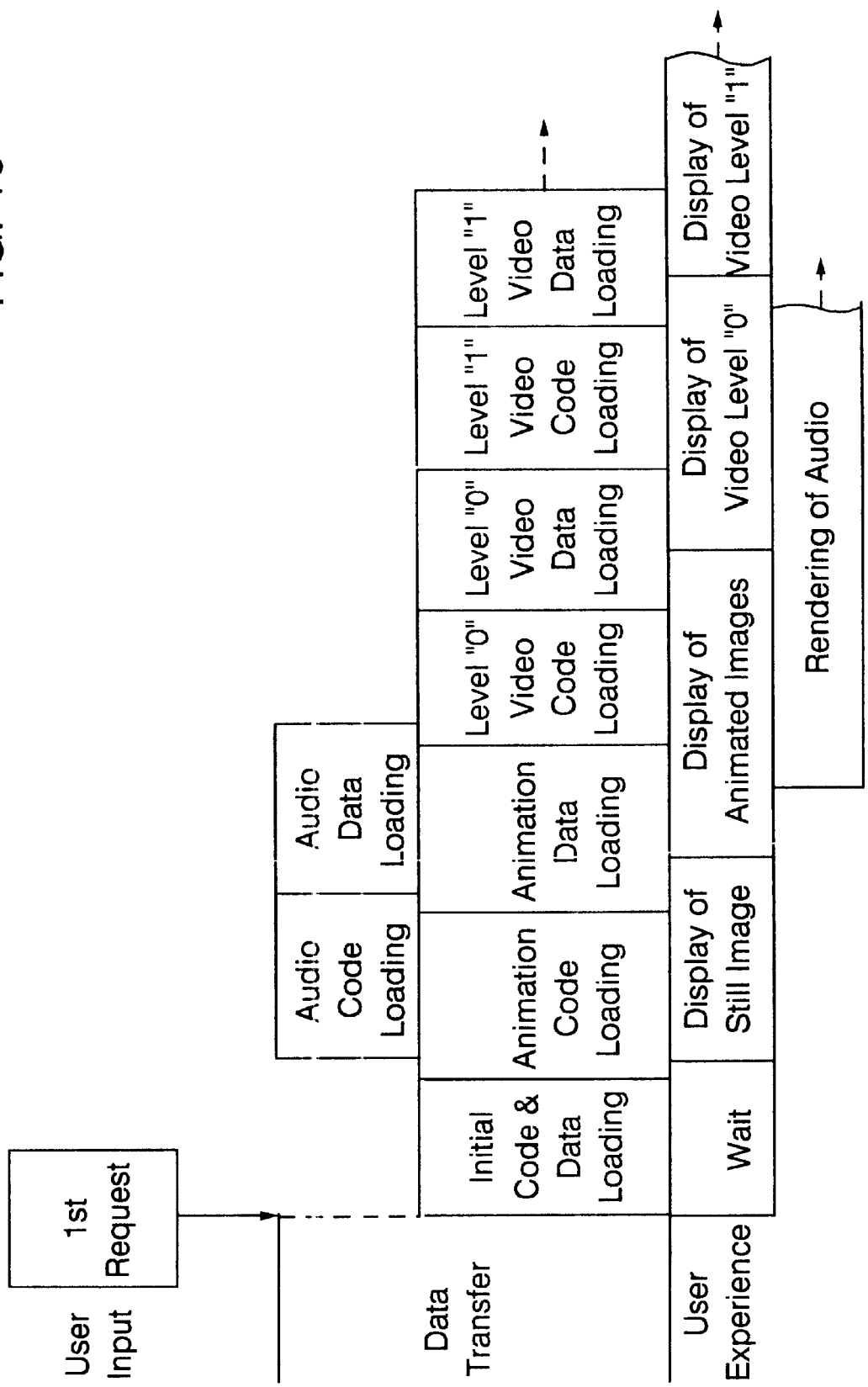

FIG. 10 shows a fully automatic mode of operation. Once an initial request is made, all data gets loaded and presented without user intervention.

Figure 11:
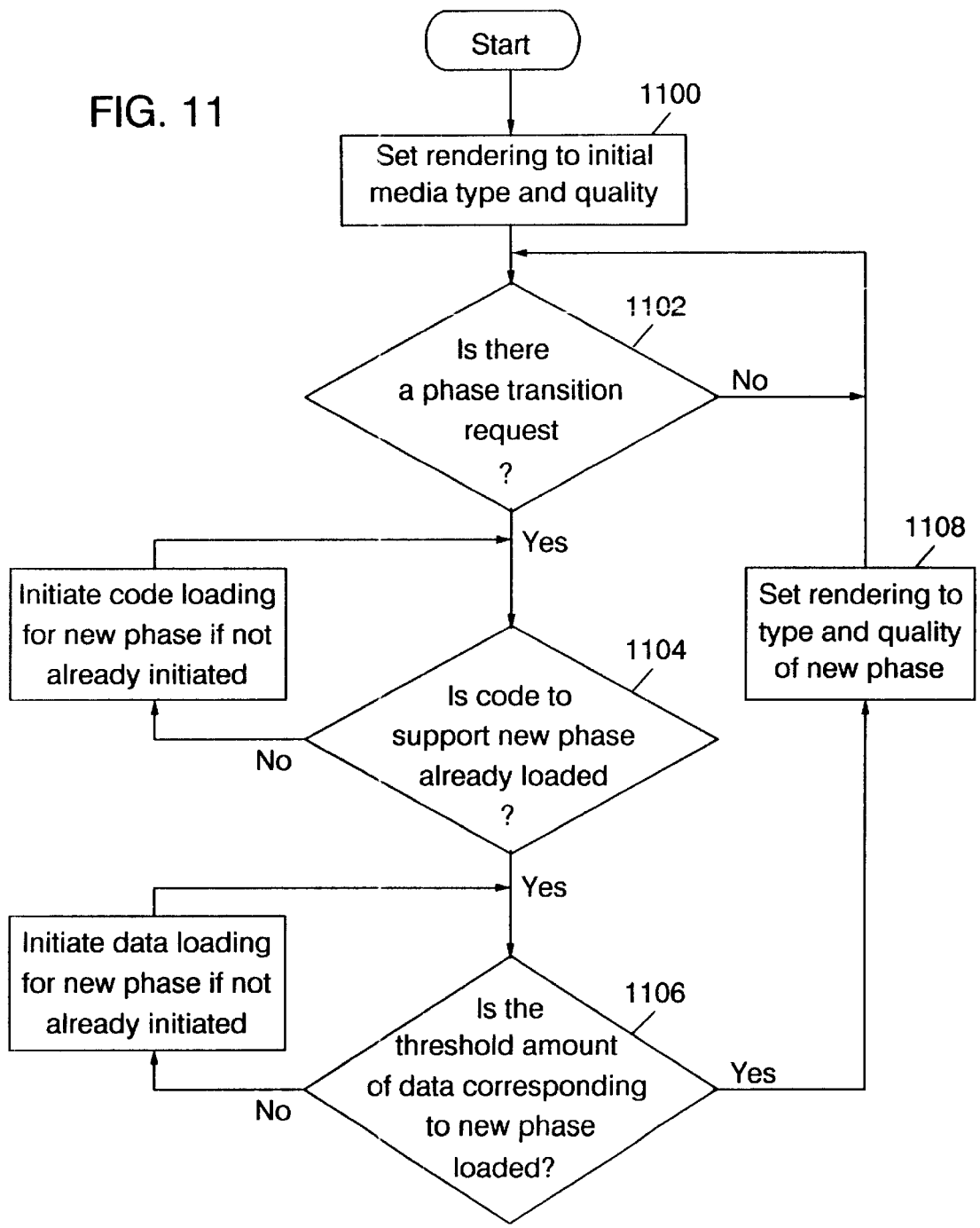

Referring to FIG. 11 while the operation is set 1100 to a first phase type, the client's terminal determines if there has been a request for transition to a second phase type 1102. If there has been no request, the presentation of the first phase type continues. If there is a request for change, a interrogation is made to see if the code for the new phase is already loaded 1104 in whole or part. If fully loaded, rendering of the new phase begins with the next frame of the presentation. If not fully loaded, the transition must await loading of all the code. Once all the code is loaded, the system checks to see if sufficient data has been loaded 1106 to support uninterrupted continuance of the presentation without reverting back to the first phase code. Once that level has been reached, the system starts rendering the new phase 1108.

Figure 12:
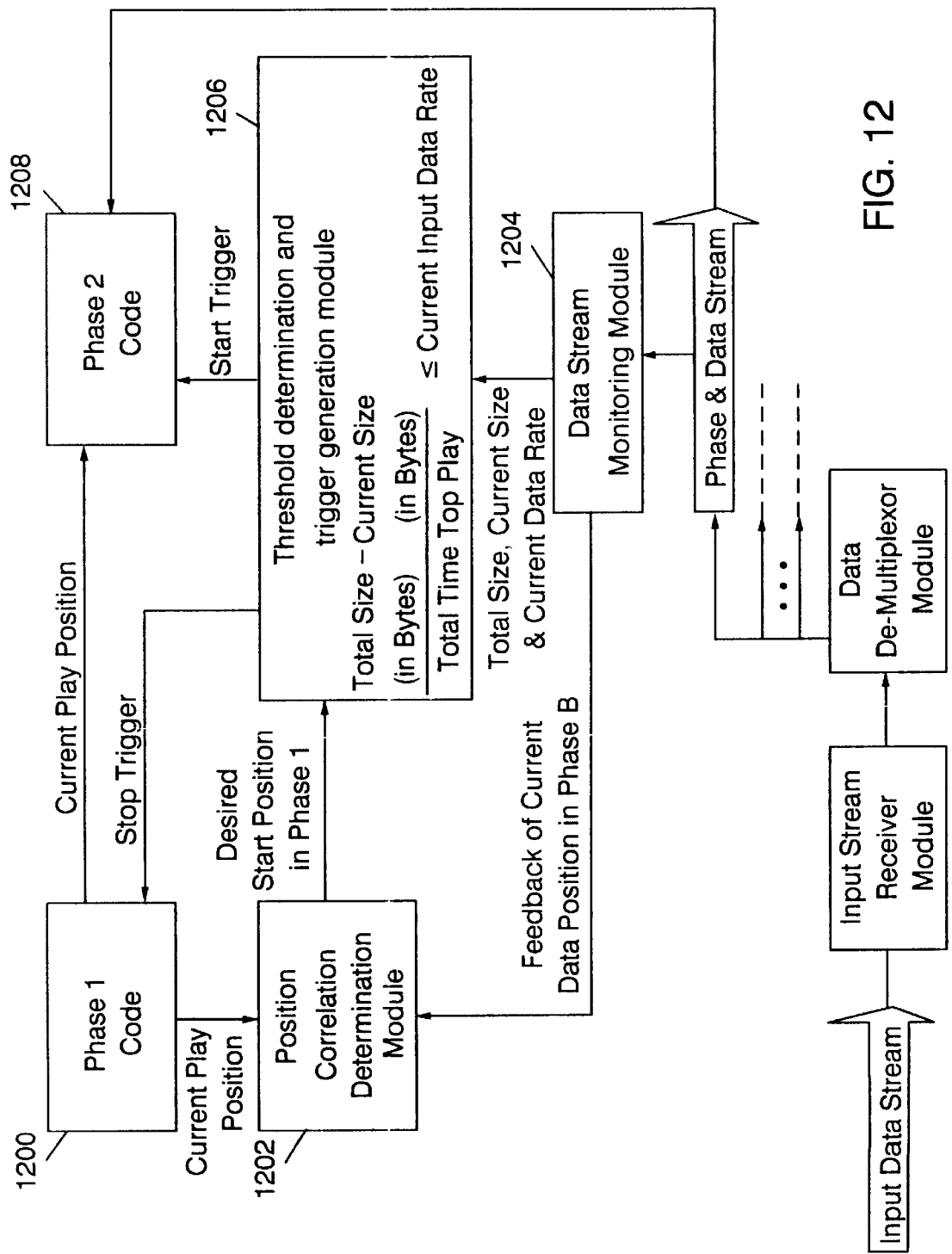

As shown in FIG. 12, position determining module 1202 monitors phase 1 code 1200 to determine the status of the performance of the first phase on the client's terminal. The position determining module 1202 also receives data from a data stream monitoring module 1204 that monitors how much phase 2 data has been received. When, based on the rate of receipt of the code, it is determined that sufficient phase code has been received to enable uninterrupted completion of the presentation, transition of the presentation of phase 2 data is triggered by the threshold determination module 1206,. by providing a stop trigger to the phase 1 code and a start trigger to the phase 2 code. FIG. 13 shows the level of the received code. It can be seen that the transition from the first to second phase presentations occur prior to completion of the presentation at the first phase.

Figure 14:
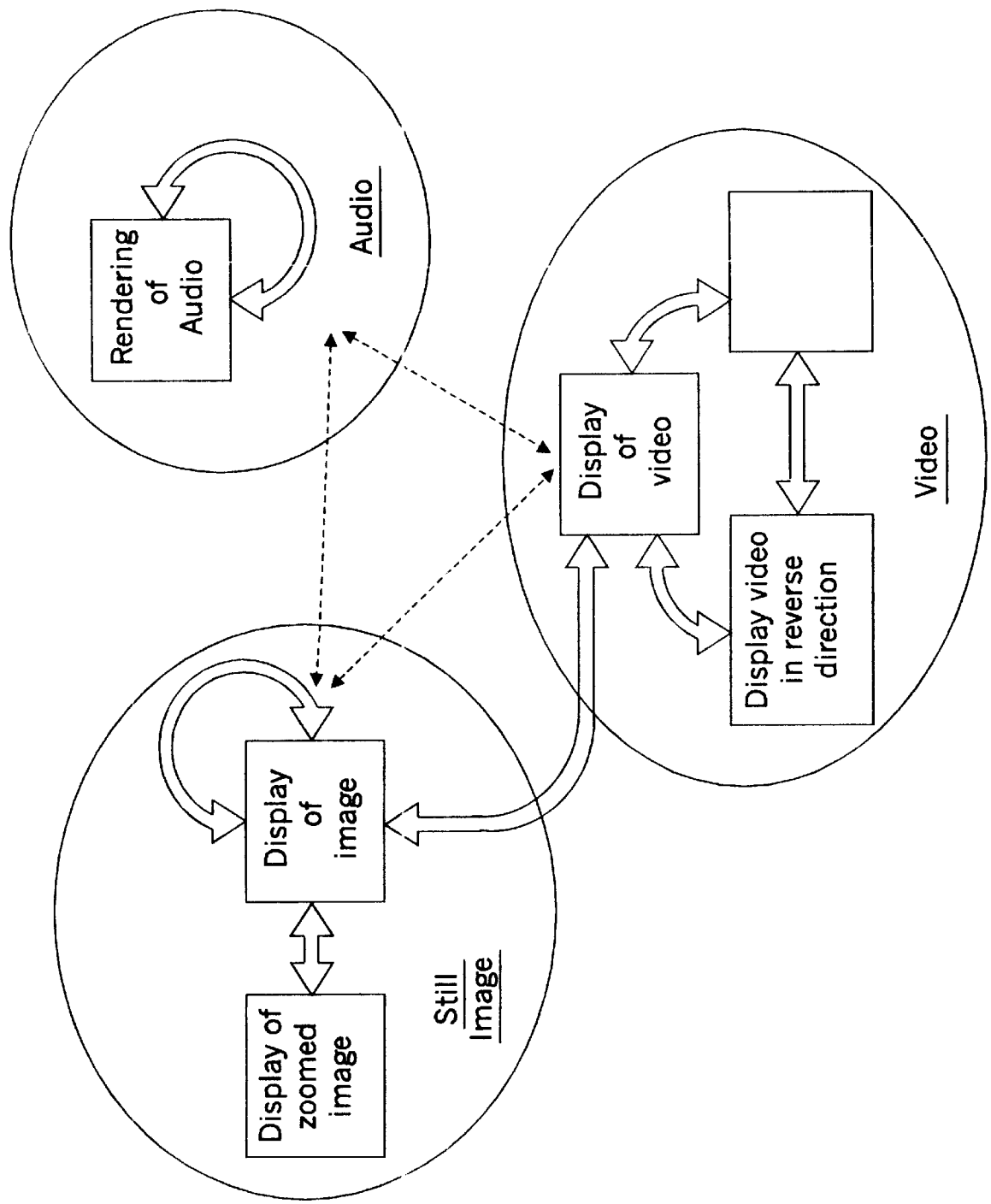
FIG. 14 shows user control of the display of information from a presentation wherein the presentation is fully loaded into the users system.

FIG. 14 represents options available to the user when all data has been fully loaded into his machine. The user can choose between the animation display 1402 and a full motion video display 1404. Within each display type, the use can display the work in the forward or reverse direction 1406, and may zoom in on sections of the item displayed 1408. He also has control of the audio 1410 independently of the video displays and may alter the audio to his needs.

Above we have described one embodiment of the invention. It is apparent to those skilled in the art that a number of changes can be made in this embodiment. Therefore the invention is not limited to this one embodiment but shall be interpreted by the spirit and scope of the appended claims.

What is claimed is:

1. A method for the presentation of heterogeneous media on a network comprising:

dividing the presentation of a scene into a sequence of multiple phases for transferring from a network server to a network client terminal, each succeeding phase in the sequence duplicating in greater detail one or more images in the preceding phase, with the code for each of the phases transferred before the data of that phase;

transferring to the client terminal code and data for two or more of the multiple phases and code to monitor and control the renderings of the presentation;

monitoring, at the client's terminal, of the progress of the performance at least one of the phases as it is rendered at the clients terminal; and using the transferred code for monitoring and controlling the rendering of the performance, changing at the client's terminal the performance from the data of a rendered phase to the data of the more detailed rendition containing the duplicated images in the succeeding phase intermediate the transfer of the data of the second phase when sufficient data from the succeeding phase has been transferred to the client's terminal and the rate of transfer to the client's terminal is sufficient to provide from the point of change uninterrupted and seamless rendering of the images of the presentation.

2. The method of claim 1 including the step of providing a display of a still image in the data of the rendered phase and an animated sequence starting with that image in the data of the succeeding phase.

3. The method of claim 1 including the step of providing an animated sequence of images in the data of the rendered phase and a video sequence of those images in the data of the succeeding phase.

4. The method of claim 1 including the step of providing a video sequence of duplicated images of the scene in the data of the rendered phase and a more detailed video segment of the duplicated images in the data of the succeeding phase.

5. The method of claim 1 including the step of:

transferring to the user of the multiple phases wherein a first phase contains data for a still image of an object, a second phase contains data for an animated image of an object, a third phase contains data for a video image of the object and a fourth phase contains data for a more detailed video image.

6. The method of claim 1 wherein one or more of the sequence of multiple phases includes an audio presentation.

7. The method of claim 1 including transferring an additional one or more of the multiple phases.

8. The method of claim 1 including the step of transferring more than one phase of the sequence on a first request by the user for information and transferring additional phases on request by the user for further information.

9. The method of claim 1 including the step of transferring all the multiple phases of the sequence to the user on a first request for information.

10. The method of claim 7 including the step of: making one or more of the transitions of the display from one phase to the other under the control of the client.

11. The method of claim 7 including the step of making the transition of the performance of a first phase to the performance of a second phase under the control of the client.

12. The method of claim 7 wherein one of the phases includes 3D geometric data.

13. The method of claim 1 wherein changing the presentation from a first phase to a second phase involves one or more of the following changes, adding a media type, changing from one media type to another media type, changing the size of a segment of a media type and changing the quality of a media type.

14. The method of claim 1 including transmitting the multiple phases in order of increasing complexity irrespective of the order in which they are requested by the client.

15. The method of claim 1 including providing code in the presentation to inform the server of the progress of the performance at the clients terminal.

16. The method of claim 1 including the step of including in the presentation file a framing format that identify the data segments in this file that correspond to key frames.

17. A software product on computer usable media for a heterogeneous media performance on a network comprising:

software for dividing a presentation of a scene into multiple phases for transferring from a network server to a client terminal, each succeeding phase providing greater detail of the scene in the preceding phase, with the code for each of the phases transferred before the data of that phase;

software for transferring to the client terminal code and data for two or more of the multiple phases;

software for monitoring at the client's terminal the progress of the performance of the first of two phases as it is rendered at the clients terminal; and software for changing at the client's terminal the performance from the data of the first phase to the data of the second phase intermediate the complete transfer of the data of the more detailed rendition of the scene in the second phase when sufficient data from the second phase has been transferred to the client's terminal and the rate of transfer to the client's terminal is sufficient to provide from the point of performance uninterrupted rendering of the presentation.

18. A method for the presentation of heterogeneous media on a network comprising:

providing the same scene containing images of an object in a plurality different sequences each sequence providing a different level of detail to the object;

dividing the presentation of the scene into multiple phases for transferring from a network server to a network client terminal, each succeeding phase containing images of the object from one of the different sequences providing the object in greater detail than in the preceding phase, with the code for each of the phases transferred before the data of that phase;

transferring to the client terminal code and data for two or more of the multiple phases for rendering at the client's terminal and code for monitoring and controlling the rendering of the performance at the client's terminal;

monitoring and controlling at the client's terminal the progress of the presentation of each of the phases as it is rendered at the client's terminal; and using the code on monitoring and controlling the rendering of the performance of the client's terminal for changing at the client's terminal the performance from the data of images of the less detailed phase to the data of images in the more detailed phase intermediate the transfer of the data of the more detailed phase when sufficient data from the more detailed phase will be available at the client's terminal to provide from the point of change uninterrupted rendering of the presentation.

19. The method of claim 18 including the step of monitoring the transfer of data to the client's terminal to determine if the data transferred and the rate of transfer is sufficient to provide sufficient data on the uninterrupted rendering of the presentation.

20. The method of claim 19 including the step of:

transferring to the user the multiple phases wherein a first phase contains data for a still image of the object, a second phase contains data for an animated image of the object, the third phase contains data for a video image of the object and the fourth phase contains data for a more detailed video image of the object.

21. The method of claim 19 wherein one or more of the multiple phases includes an audio presentation.

22. The method of claim 19 including the step of transferring more than one phase on a first request by the user for information and transferring additional phases on request by the user for further information.

23. The method of claim 19 including the step of transferring all the multiple phases to the user on a first request for information.

24. The method of claim 19 including the step of:

making one or more of the transitions of the display from one phase to the other under the control of the client.

25. The method of claim 20 wherein one of the phases includes 3D geometric data.

26. The method of claim 20 including transmitting the multiple phases in order of increasing complexity irrespective of the order in which they are requested by the client.

27. The method of claim 20 including providing code in the presentation to inform the server of the progress of the performance at the client's terminal.

* * * * *